US012614008B2

(12) United States Patent
Furlong et al.

(10) Patent No.: US 12,614,008 B2
(45) **Date of Patent: *Apr. 28, 2026**

(54) ARTIFICIAL AGING OF DIGITAL TWIN TO PREDICT HEALTH CONDITION OF INFRASTRUCTURE

(71) Applicant: Dell Products L.P., Round Rock, TX (US)

(72) Inventors: Judith A. Furlong, Natick, MA (US); Aidan O Mahony, Cork (IE); Robert A. Lincourt, Jr., Franklin, MA (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 316 days.

This patent is subject to a terminal disclaimer.

(21) Appl. No.: 18/128,471

(22) Filed: Mar. 30, 2023

(65) Prior Publication Data

US 2024/0330530 A1 Oct. 3, 2024

(51) Int. Cl.
*G06F 30/20* (2020.01)
*G06F 21/57* (2013.01)
*G06F 119/04* (2020.01)

(52) U.S. Cl.
CPC ............ *G06F 30/20* (2020.01); *G06F 21/577* (2013.01); *G06F 2119/04* (2020.01)

(58) Field of Classification Search
None
See application file for complete search history.

(56) References Cited

U.S. PATENT DOCUMENTS

| | | | |
|---|---|---|---|
| 7,246,056 B1 | 7/2007 | Brewton | |
| 11,216,261 B1 * | 1/2022 | Moyal ..................... | G06F 9/455 |
| 11,283,863 B1 | 3/2022 | Cleaver et al. | |
| 11,463,322 B1 | 10/2022 | Sha et al. | |
| 11,595,271 B2 | 2/2023 | Sha et al. | |

(Continued)

OTHER PUBLICATIONS

A. Cichocki et al., "Era of Big Data Processing: A New Approach via Tensor Networks and Tensor Decompositions," arXiv:1403. 2048v4, https://arxiv.org/abs/1403.2048, Aug. 24, 2014, 30 pages.

(Continued)

*Primary Examiner* — Chris Parry
*Assistant Examiner* — Abderrahmen Chouat
(74) *Attorney, Agent, or Firm* — Ryan, Mason & Lewis, LLP

(57) ABSTRACT

A method obtains at least one virtual representation representing an infrastructure in a first state and applies a first dataset to the virtual representation to artificially advance the virtual representation to represent the infrastructure in a second state. The method obtains results representing the infrastructure in the second state, wherein at least a portion of the results are indicative of a predicted health condition associated with the infrastructure. The method applies a second dataset to the virtual representation to artificially advance the virtual representation to represent the infrastructure in a third state and obtains results representing the infrastructure in the third state, wherein at least a portion of the results are indicative of an outcome to a solution applied via the second dataset to the predicted health condition associated with the infrastructure.

20 Claims, 7 Drawing Sheets

200

(56) References Cited

U.S. PATENT DOCUMENTS

| | | | |
|---|---|---|---|
| 2016/0218933 A1 | 7/2016 | Porras et al. | |
| 2016/0239333 A1 | 8/2016 | Cowperthwaite et al. | |
| 2018/0137219 A1 | 5/2018 | Goldfarb et al. | |
| 2019/0079849 A1 | 3/2019 | Korn et al. | |
| 2019/0356556 A1 | 11/2019 | Vicat-Blanc | |
| 2020/0026575 A1 | 1/2020 | Guim Bernat et al. | |
| 2020/0211699 A1* | 7/2020 | Nuthi | G16H 40/40 |
| 2020/0244722 A1 | 7/2020 | Jeuk et al. | |
| 2020/0363850 A1 | 11/2020 | Lee et al. | |
| 2020/0401456 A1 | 12/2020 | Sivak et al. | |
| 2021/0021126 A1 | 1/2021 | Hall et al. | |
| 2021/0383611 A1 | 12/2021 | Kanski et al. | |
| 2022/0029930 A1 | 1/2022 | Yilma et al. | |
| 2022/0076151 A1 | 3/2022 | Loesch et al. | |
| 2022/0100182 A1 | 3/2022 | Mehrotra et al. | |
| 2022/0167262 A1 | 5/2022 | Ding et al. | |
| 2022/0173979 A1 | 6/2022 | Wickes et al. | |
| 2022/0309079 A1 | 9/2022 | Kurniawan et al. | |
| 2023/0026782 A1 | 1/2023 | Sha et al. | |
| 2023/0108874 A1 | 4/2023 | Morlot et al. | |
| 2023/0115586 A1* | 4/2023 | Song | E02F 9/261 701/50 |
| 2024/0168857 A1 | 5/2024 | Ahuja et al. | |
| 2024/0172001 A1 | 5/2024 | Farooq et al. | |
| 2024/0185048 A1 | 6/2024 | Sebastian et al. | |
| 2024/0232360 A1 | 7/2024 | Dunning et al. | |
| 2024/0330532 A1 | 10/2024 | Furlong et al. | |
| 2024/0330533 A1 | 10/2024 | Lincourt, Jr. et al. | |
| 2024/0330544 A1 | 10/2024 | Furlong et al. | |

OTHER PUBLICATIONS

C. Sonmez et al., "EdgeCloudSim," https://github.com/CagataySonmez/EdgeCloudSim, Nov. 2, 2020, 11 pages.

Melbourne Clouds Lab, "CloudSim: A Framework For Modeling And Simulation Of Cloud Computing Infrastructures And Services," http://www.cloudbus.org/cloudsim/, Accessed Aug. 12, 2021, 8 pages.

S. Kekki et al., "MEC in 5G Networks," ETSI White Paper No. 28, https://www.etsi.org/images/files/ETSIWhitePapers/etsi_wp28_mec_in_5G_FINAL.pdf, Jun. 2018, 28 pages.

ETSI, "Multi-access Edge Computing (MEC); Application Mobility Service API," Group Specification MEC 021 V2.1.1, https://www.etsi.org/deliver/etsi_gs/MEC/001_099/021/02.01.01_60/gs_MEC021v020101p.pdf, Jan. 2020, 47 pages.

ETSI, "ETSI MEC: An Introduction," https://www.etsi.org/images/files/technologies/ETSI-MEC-Public-Overview.pdf, Apr. 2021, 39 pages.

W. Sun et al., "Reducing Offloading Latency for Digital Twin Edge Networks in 6G," IEEE Transactions on Vehicular Technology, Oct. 2020, pp. 12240-12251, vol. 69, No. 10.

S.N. Das et al., "Digital Twin based Fault Analysis in Hybrid-cloud Applications," 2022 IEEE/ACM 10th International Workshop on Software Engineering for Systems-of-Systems and Software Eco-systems (SESoS), Pittsburgh, PA, USA, Nov. 2022, pp. 29-32.

* cited by examiner

100

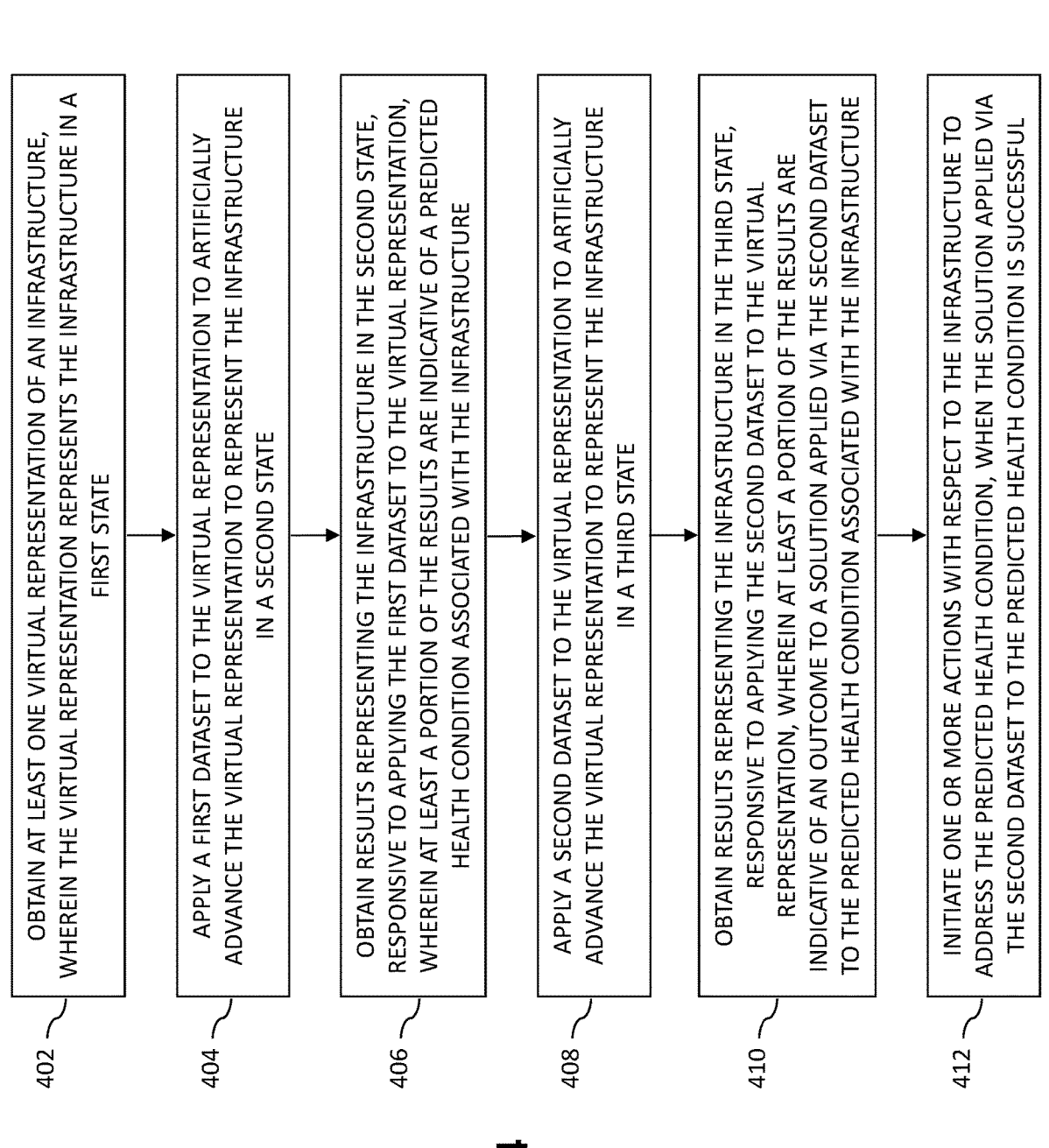

400

402 — OBTAIN AT LEAST ONE VIRTUAL REPRESENTATION OF AN INFRASTRUCTURE, WHEREIN THE VIRTUAL REPRESENTATION REPRESENTS THE INFRASTRUCTURE IN A FIRST STATE

404 — APPLY A FIRST DATASET TO THE VIRTUAL REPRESENTATION TO ARTIFICIALLY ADVANCE THE VIRTUAL REPRESENTATION TO REPRESENT THE INFRASTRUCTURE IN A SECOND STATE

406 — OBTAIN RESULTS REPRESENTING THE INFRASTRUCTURE IN THE SECOND STATE, RESPONSIVE TO APPLYING THE FIRST DATASET TO THE VIRTUAL REPRESENTATION, WHEREIN AT LEAST A PORTION OF THE RESULTS ARE INDICATIVE OF A PREDICTED HEALTH CONDITION ASSOCIATED WITH THE INFRASTRUCTURE

408 — APPLY A SECOND DATASET TO THE VIRTUAL REPRESENTATION TO ARTIFICIALLY ADVANCE THE VIRTUAL REPRESENTATION TO REPRESENT THE INFRASTRUCTURE IN A THIRD STATE

410 — OBTAIN RESULTS REPRESENTING THE INFRASTRUCTURE IN THE THIRD STATE, RESPONSIVE TO APPLYING THE SECOND DATASET TO THE VIRTUAL REPRESENTATION, WHEREIN AT LEAST A PORTION OF THE RESULTS ARE INDICATIVE OF AN OUTCOME TO A SOLUTION APPLIED VIA THE SECOND DATASET TO THE PREDICTED HEALTH CONDITION ASSOCIATED WITH THE INFRASTRUCTURE

412 — INITIATE ONE OR MORE ACTIONS WITH RESPECT TO THE INFRASTRUCTURE TO ADDRESS THE PREDICTED HEALTH CONDITION, WHEN THE SOLUTION APPLIED VIA THE SECOND DATASET TO THE PREDICTED HEALTH CONDITION IS SUCCESSFUL

FIG. 4

ARTIFICIAL AGING OF DIGITAL TWIN TO PREDICT HEALTH CONDITION OF INFRASTRUCTURE

FIELD

The field relates generally to infrastructure environments, and more particularly to virtual representations (e.g., digital twins) in such infrastructure environments (e.g., computing environment).

BACKGROUND

Recently, techniques have been proposed to attempt to represent infrastructure in a computing environment so as to more efficiently manage the infrastructure including attributes and operations associated with the infrastructure. One proposed way to represent the infrastructure is through the creation of a digital twin architecture. A digital twin typically refers to a virtual representation (e.g., virtual copy) of a physical (e.g., actual or real) product, process, and/or system. By way of example, a digital twin can be used to analyze the performance of a physical product, process, and/or system in order to better understand operations associated with the product, process, and/or system being virtually represented. However, utilization of digital twins for various types of infrastructure can be a significant challenge.

SUMMARY

Embodiments provide automated management techniques associated with virtual representations that represent infrastructure.

For example, according to one illustrative embodiment, a method obtains at least one virtual representation of an infrastructure, wherein the virtual representation represents the infrastructure in a first state. The method applies a first dataset to the virtual representation to artificially advance the virtual representation to represent the infrastructure in a second state. The method obtains results representing the infrastructure in the second state, responsive to applying the first dataset to the virtual representation, wherein at least a portion of the results are indicative of a predicted health condition associated with the infrastructure. The method applies a second dataset to the virtual representation to artificially advance the virtual representation to represent the infrastructure in a third state. The method obtains results representing the infrastructure in the third state, responsive to applying the second dataset to the virtual representation, wherein at least a portion of the results are indicative of an outcome to a solution applied via the second dataset to the predicted health condition associated with the infrastructure. The method initiates one or more actions with respect to the infrastructure to address the predicted health condition, when the solution applied via the second dataset to the predicted health condition is successful.

Further illustrative embodiments are provided in the form of a non-transitory computer-readable storage medium having embodied therein executable program code that when executed by a processor causes the processor to perform the above steps. Additional illustrative embodiments comprise an apparatus with a processor and a memory configured to perform the above steps.

Advantageously, illustrative embodiments provide functionalities for artificially aging (advancing) a virtual representation (e.g., digital twin) of an infrastructure (e.g., a computing infrastructure). Among other advantages, by way of example only, such artificial aging of a digital twin enables an understanding of a current state of health of the infrastructure when access to the infrastructure may be limited or otherwise unavailable, and/or an understanding of a future state of health of the infrastructure. Based on results generated in accordance with the digital twin, one or more actions can be initiated with respect to the health of the infrastructure.

These and other features and advantages of embodiments described herein will become more apparent from the accompanying drawings and the following detailed description.

BRIEF DESCRIPTION OF THE DRAWINGS

FIG. 4 illustrates a methodology for artificially aging a digital twin to predict one or more health conditions of an infrastructure according to an illustrative embodiment.

DETAILED DESCRIPTION

Figure 1:
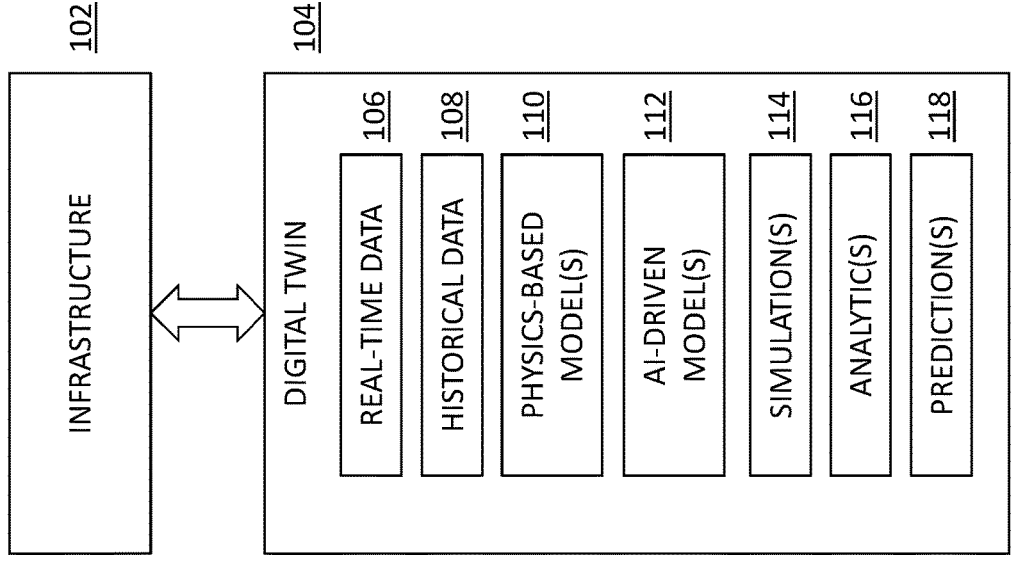
FIG. 1 illustrates a digital twin environment according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems may comprise cloud (private, public or hybrid) and edge computing and storage systems, as well as other types of processing systems comprising various combinations of physical and virtual processing resources.

It is realized herein that it is often difficult to debug issues and/or predict infrastructure (e.g., product) behavior in actual customer deployed environments since the infrastructure vendor is not able to accurately replicate the environment or the operational constraints of every customer's environment. Also, many customers do not deploy and operate the infrastructure in accordance with the vendor recommendations. Still further, customers are often unable or unwilling (e.g., for security or other confidential purposes) to provide the infrastructure vendor access to the infrastructure deployed in the customer environment. Additionally, some infrastructure behavior (e.g., anomalous behavior such as one or more health conditions) may be difficult to predict due to the nature of the infrastructure itself.

Illustrative embodiments overcome the above and other technical drawbacks associated with infrastructure management approaches, particularly (but not limited to) when the infrastructure is deployed in a customer environment, by providing functionalities for generating or otherwise obtaining one or more digital twins to virtually represent the infrastructure. Illustrative embodiments then artificially age the one or more digital twins by applying one or more datasets to the one or more digital twins so as to advance the one or more digital twins to states representing a current configuration of the infrastructure, a future configuration of the infrastructure, and/or some other desired configuration of the infrastructure. This may include, but is not limited to, hardware, software and/or data configurations of the infrastructure. Based on results generated in accordance with the digital twin, one or more debugging actions can be initiated with respect to the infrastructure.

According to illustrative embodiments, a digital twin refers to a virtual representation or a virtual copy of a physical (e.g., actual or real) item such as, but not limited to, a system, a device, and/or processes associated therewith, e.g., individually or collectively referred to as infrastructure. The digital twin may be synchronized with the infrastructure at a specified frequency and/or specified fidelity (e.g., resolution). By way of example, a digital twin can be used to analyze and understand performance of the infrastructure in order to achieve improved operations in the infrastructure, as well as in the environment in which the infrastructure is deployed or otherwise implemented. A digital twin can be embodied as one or more software programs that model, simulate, or otherwise represent attributes and operations of the infrastructure. Further, a digital twin may alternatively be illustratively referred to as a digital twin object or digital twin module, or simply as a digital object or digital module. A digital twin acts as a bridge between the physical and digital worlds and can be created by collecting, inter alia, real-time or other data about the infrastructure. The data is then used to create a digital duplicate of the infrastructure, allowing the infrastructure and/or the environment in which the infrastructure operates to be understood, analyzed, manipulated, and/or improved. The digital twin can also be used to predict attributes and operations of the infrastructure.

By way of example, FIG. 1 illustrates a digital twin environment 100 according to an illustrative embodiment. As shown, an infrastructure 102 is operatively coupled to a digital twin 104. As mentioned above, an infrastructure, such as infrastructure 102, is a physical item such as, in the case of a computing infrastructure, one or more devices. Devices can include, but are not limited to, one or more storage devices (e.g., storage arrays, memory systems, etc.), one or more processing devices (e.g., servers, hosts, central processing units, graphics processing units, etc.) and/or one or more network devices (e.g., routers, switches, etc.). Further, infrastructure 102 can comprise a software-based item, additional or alternative to a hardware-based item. That is, for example, the digital twin 104 may virtually represent a hardware component (e.g., a device, etc.), a software component (e.g., program code executable on a hardware component that performs or causes performance of an operation or a process, etc.), data associated with the hardware and/or software components, and combinations thereof.

While a single instance of digital twin 104 is depicted, it is to be understood that infrastructure 102 may be virtually represented by more than one instance of digital twin 104 (e.g., same or similar internal configurations) and/or by two or more different versions (e.g., different internal configurations) of digital twin 104.

Digital twin 104 is configured as shown with modules comprising real-time data 106, historical data 108, one or more physics-based models 110, one or more artificial intelligence (AI) driven models 112, one or more simulations 114, one or more analytics 116, and one or more predictions 118. Physics-based models may illustratively refer to digital models modeling a physical system, while AI-driven models may illustratively refer to digital models modeling data and/or logical aspects associated with a physical system.

By way of example, digital twin 104 obtains real-time data 106, as well as other data, from infrastructure 102. Based on the real-time data 106, previously obtained historical data 108, and/or other data, digital twin 104 functions as a digital duplicate of infrastructure 102 and executes all or a subset of the one or more physics-based models 110, one or more artificial intelligence (AI) driven models 112, one or more simulations 114, one or more analytics 116, and one or more predictions 118 to analyze and understand the attributes (e.g., parameters, settings, etc.) and operations (e.g., computations, functions, etc.) of infrastructure 102. Based on at least a portion of the results from execution of the one or more physics-based models 110, one or more AI-driven models 112, one or more simulations 114, one or more analytics 116, and one or more predictions 118, digital twin 104 can then be used to manipulate the attributes and operations of infrastructure 102 to optimize or otherwise improve the operations of infrastructure 102.

As will be illustratively explained in detail below, illustrative embodiments are further configured to artificially age digital twin 104 to enable an understanding of infrastructure 102 at a given state (e.g., current, future, etc.). Advantageously, illustrative embodiments enable understanding digital twin 104 of infrastructure 102 at the given state when access to infrastructure 102 may be limited or otherwise unavailable, as mentioned above. For example, assume infrastructure 102 is in a customer environment (e.g., a customer facility) and the vendor or other supplier of infrastructure 102 (e.g., original equipment manufacturer or OEM) is unable (e.g., based on logistical deficiencies or challenges and/or customer unwillingness due to security or confidentiality concerns or requirements) to remotely or locally access infrastructure 102. Illustrative embodiments therefore enable digital twin 104 to be advanced in order for digital twin 104 to reflect the given state (current, future, etc.) of infrastructure 102. As will be illustratively explained, the term "advancing" refers to applying one or more datasets to digital twin 104 such as, but not limited to, one or more workloads that infrastructure 102 would have executed, or would have to execute, to be at the given state. In response to application of the one or more datasets, results of execution of the one or more physics-based models 110, the one or more AI-driven models 112, the one or more simulations 114, the one or more analytics 116, and/or the one or more predictions 118 of digital twin 104 can be analyzed to determine one or more actions (e.g., remedial or otherwise) that can be taken with regard to infrastructure 102.

Figure 2:
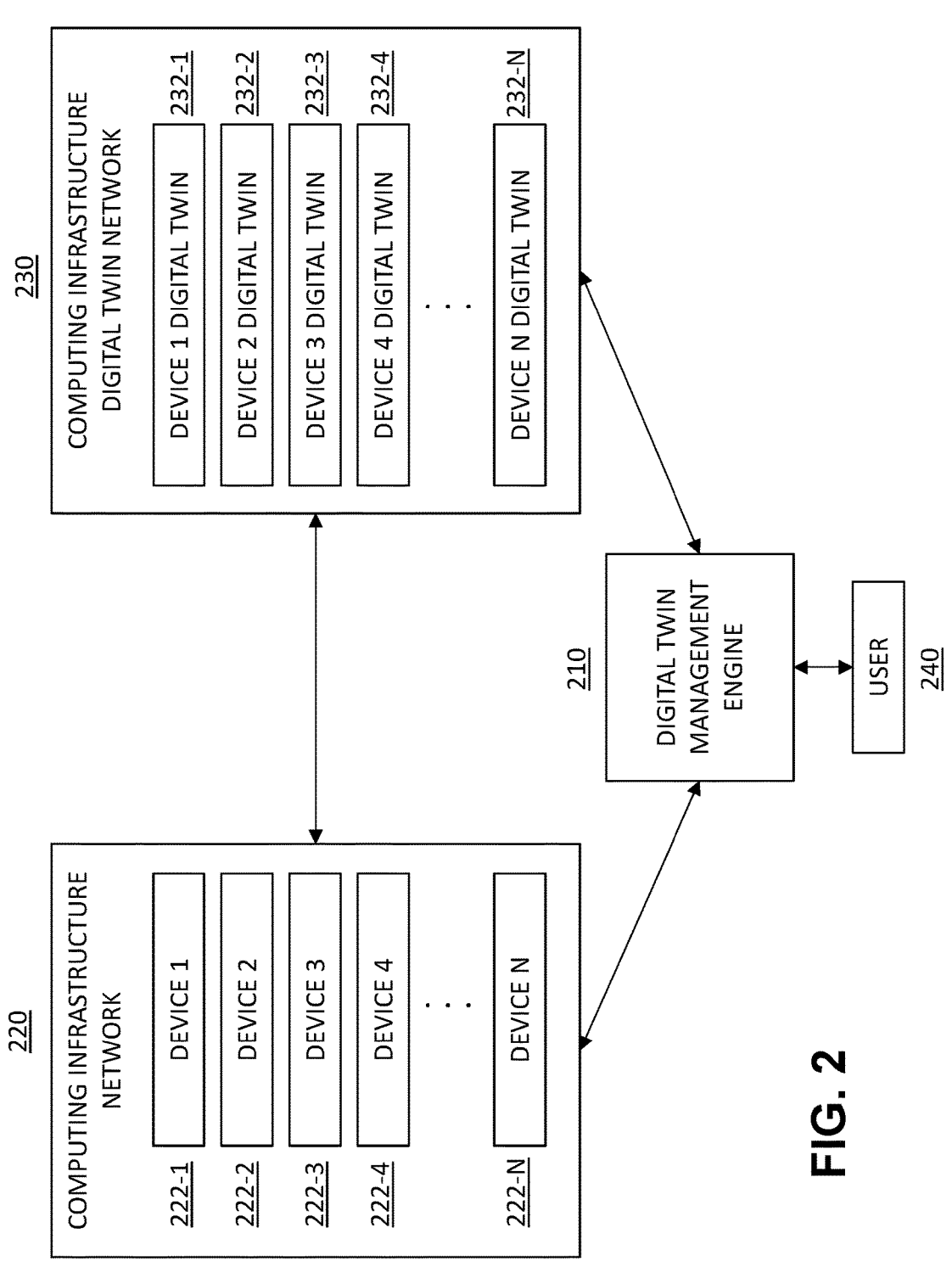
FIG. 2 illustrates a computing environment with digital twin management according to an illustrative embodiment.

Referring now to FIG. 2, a computing environment 200 is depicted within which illustrative embodiments described herein are implemented. As shown, a digital twin management engine 210 is operatively coupled to a computing infrastructure network 220, itself comprising a plurality of devices 222-1, 222-2, 222-3, 222-4, . . . , 222-N (referred to herein collectively as devices 222 and individually as device 222). Each device 222 individually or devices 222 collectively can be considered infrastructure (e.g., infrastructure 102 in FIG. 1). Devices 222 may comprise a wide variety of devices associated with computing infrastructure network 220 including, but not limited to, smart phones, laptops, other mobile devices, personal computers (PC), servers (e.g., edge or otherwise), CPUs, GPUs, gateways, Internet of Thing (IoT) devices, storage arrays, memory devices, routers, switches, appliances, and other computing devices that are part of or otherwise associated with computing infrastructure network 220. While computing infrastructure network 220 is referred to in the singular, it is to be appreciated that, in illustrative alternative embodiments, computing infrastructure network 220 may comprise multiple networks wherein a subset of devices of at least one network are interconnected with a subset of devices from at least another network.

Computing environment 200 further depicts digital twin management engine 210 operatively coupled to a computing infrastructure digital twin network 230 comprising a plurality of device digital twins 232-1, 232-2, 232-3, 232-4, . . . , 232-N (referred to herein collectively as device digital twins 232 and individually as device digital twin 232). Device digital twins 232 respectively correspond to devices 222 in computing infrastructure network 220, i.e., there is a device digital twin 232 that virtually represents a device 222 (e.g., device digital twin 232-1 virtually represents device 222-1, . . . , device digital twin 232-N virtually represents device 222-N). Note, however, that while FIG. 2 illustrates a one-to-one correspondence between devices 222-1, 222-2, 222-3, 222-4, . . . , 222-N and device digital twins 232-1, 232-2, 232-3, 232-4, . . . , 232-N, alternative embodiments may comprise alternative correspondences, e.g., a single device digital twin 232 can represent more than one of devices 222, more than one of device digital twins 232 can represent a single device 222, etc.

As further shown in FIG. 2, user 240 interacts with digital twin management engine 210. User 240 can represent an individual, a computing system, or some combination thereof. In one example, user 240 comprises a system or IT administrator. It is to be further understood that digital twin management engine 210 can be considered as an example of a controller.

It is to be appreciated that, in one or more embodiments, digital twin management engine 210 is configured to generate device digital twins 232 or otherwise obtain one or more of device digital twins 232. In one or more illustrative embodiments, one or more device digital twins 232 can be configured the same as or similar to digital twin 104 as shown in FIG. 1. In such a case, all or a subset of the one or more physics-based models 110, one or more AI-driven models 112, one or more simulations 114, one or more analytics 116, and one or more predictions 118 are configured based on the particular device 222 being virtually represented. Thus, some or all of real-time data 106 and/or some or all of historical data 108 can be data collected from device 222 and/or some other data source.

In one or more illustrative embodiments, by way of example only, assume that a given device digital twin 232 is needed/desired for on-demand simulations. That is, when user 240 wishes to simulate changes to a given device 222, user 240 can request digital twin management engine 210 to create/construct (spin up or instantiate) a digital twin of the given device 222 using one or more corresponding images (e.g., snapshots or the like) from a device image datastore (not expressly shown) augmented with real-time data associated with the given device 222. In some illustrative embodiments, digital twin management engine 210 instantiates one or more virtual machines or VMs (e.g., using vSphere, Kernel-based Virtual Machines or KVM, etc.) or one or more containers (e.g., using a Kubernetes container orchestration platform, etc.) to implement the given device digital twin 232. Digital twin management engine 210 matches the specifications of the given device 222 and loads the one or more corresponding images to create a virtual representation (device digital twin 232) for a specific fidelity (resolution) of the given device 222. Depending on the use case and data availability, one or multiple digital twin fidelities can be selected by user 240, e.g., high resolution and low resolution. For example, a high-resolution digital twin may necessitate the availability of a large amount and rich infrastructure data with minimal need to involve human technicians, while a low-resolution digital twin may necessitate more human involvement due to less availability of infrastructure data. User 240 can then use the constructed device digital twin 232 to test and/or simulate changes to the given device 222.

Now assume, as mentioned above, computing infrastructure network 220 is at a customer location of an OEM that manufactured devices 222 and/or delivered or deployed devices 222 as part of computing infrastructure network 220 at the customer location. Advantageously, illustrative embodiments leverage one or more of device digital twins 232 to model one or more of devices 222 of computing infrastructure network 220 deployed at the customer location. Customer workloads, workload patterns, and/or causal variables (collectively, datasets) associated with the one or more of devices 222 of computing infrastructure network 220 can be obtained by digital twin management engine 210. Such datasets are applied by digital twin management engine 210 to the one or more corresponding device digital twins 232 to artificially advance (age) the one or more corresponding device digital twins 232 to accurately represent one or more states (e.g., hardware, software, data configurations as mentioned above) of the one or more of devices 222 of computing infrastructure network 220.

Support personnel and/or automated systems can then interact with the one or more device digital twins 232 (e.g., directly or through digital twin management engine 210) to determine root cause issues, improve device reliability, and otherwise initiate one or more actions, allowing the customer to continue operations of devices 222 onsite without interruption. For example, in an exemplary operation, a device digital twin 232 and a corresponding device 222 can age in parallel whereby both device digital twin 232 and corresponding device 222 receive updates and enhancements (e.g., new models, new data sources, etc.). Advantageously, digital twin management engine 210 is also configured to accelerate the process of aging each of device digital twins 232 to predict the future behaviors of corresponding devices 222 and thus computing infrastructure network 220, as mentioned herein.

By way of example, assume device digital twin 232 leverages a mix of physics-based models 110 and AI-driven models 112. Accordingly, physics-based models 110 can be used to codify the behavior of hardware aspects of the infrastructure and leverage test and historical support data and knowledge of the physical components. Additionally, AI-driven models 112 can be used to create synthetic data based on infrastructure historical support data, heuristics, and institutional knowledge (e.g., support technicians). Once operational, models used to create the device digital twin 232 can be augmented with additional input created through the observation of the device digital twin 232 itself. During the operation of the device digital twin 232, the performance, behavior, and physical state of the device digital twin 232 changes. These changes are captured and then reflected in future iterations of the digital twin models (e.g., training process). These changes are validated by the similar behavior and operation of the corresponding device 222 itself. At any point in time, the models deployed to the device digital twin 232 are representative of the codification of the behavior and operational state of the corresponding device 222. New models are created which instantiate the changes to the performance, operation, and physical state of the device digital twin 232 that occur over time. These new models can then be used in a feedback loop. Based on results generated in accordance with the digital twin, one or more actions can be initiated with respect to the infrastructure. These artificial aging functionalities are further illustrated and explained in the context of FIGS. 3A and 3B.

Figure 3A:
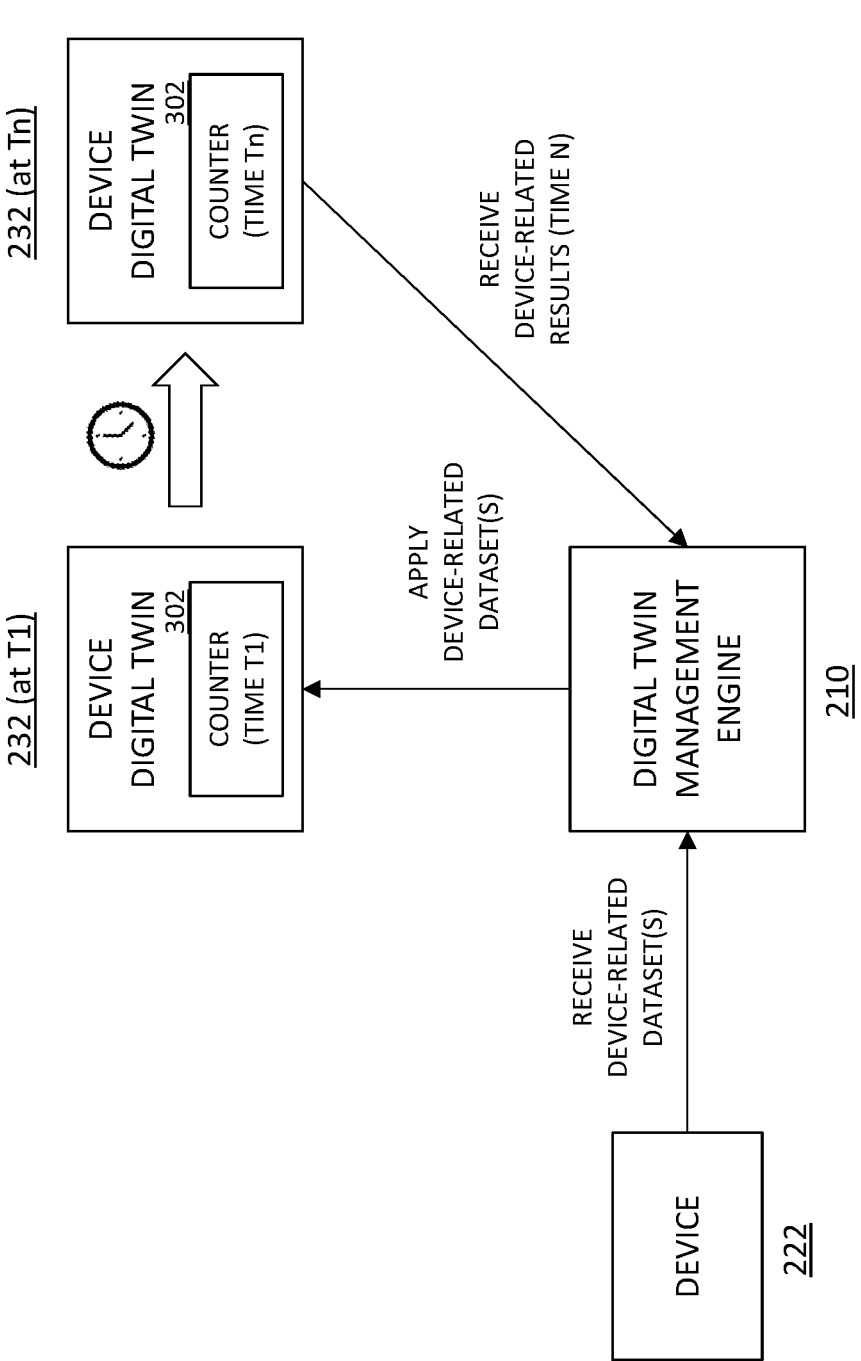
FIG. 3A illustrates an exemplary process of artificially aging a digital twin according to an illustrative embodiment.

FIG. 3A illustrates an exemplary process 300 of artificially aging a digital twin according to an illustrative embodiment. By way of example, process 300 can be executed in accordance with computing environment 200 of FIG. 2. As shown, process 300 involves digital twin management engine 210 and device digital twin 232 at a first time T1 corresponding to a first state of device 222, and at an nth (e.g., second) time Tn corresponding to an nth (e.g., second) state of device 222. Note that a counter 302 in device digital twin 232 can be used to maintain the time instance associated with each state of device 222 that device digital twin 232 is virtually representing.

Thus, as shown, assume that digital twin management engine 210 receives one or more device-related datasets from device 222. Note that one or more device-related datasets can alternatively or additionally be received from some other data source other than directly from device 222. As mentioned above, the one or more datasets can be, but are not limited to, workloads, workload patterns, and/or causal variables associated with device 222. Digital twin management engine 210 then applies all or a portion of the one or more datasets to device digital twin 232 to advance device digital twin 232 from a first time T1 corresponding to a first state of device 222 to an nth (e.g., second) time Tn corresponding to an nth (e.g., second) state of device 222. It is assumed that the goal is that device digital twin 232 represent the state (e.g., hardware, software, and/or data configurations) of device 222 at Tn. Digital twin management engine 210 then receives device-related results (e.g., results of execution of one or more physics-based models 110, the one or more AI-driven models 112, the one or more simulations 114, the one or more analytics 116, and/or the one or more predictions 118 that constitute device digital twin 232) and can initiate or otherwise take one or more actions in response to at least a portion of the received results.

In one non-limiting example, assume that device 222 being virtually represented is a storage array with an associated file system stored thereon, and that it is desired to place the device digital twin 232 into a state consistent with the storage array, e.g., so as to troubleshoot a problem being experienced by the actual storage array (as will be illustratively explained below in the context of FIG. 3B). Digital twin management engine 210 can artificially age (advance) device digital twin 232 (starting at time T1) by executing the same or similar input (write) and/or output (read) operations (IO operations) in the storage space of the file system (ending at time Tn) of device 222. In this way, at time Tn, device digital twin 232 virtually represents the file system of device 222 at its current state and thus can reveal one or more problems in the actual file system such that one or more remedial actions can be initiated by a user (e.g., administrator and/or automated system).

As explained herein, device digital twin 232 may be initially generated and then artificially aged by digital twin management engine 210 by obtaining configuration-related metadata for device 222 (one or more device-related datasets) and creating a virtualized replica of device 222 based on at least a portion of the configuration-related metadata. By way of example only, configuration-related metadata for device 222 may comprise one or more of hardware specifications, network specifications, hardware telemetry, and security information associated with a current device configuration of device 222. By way of further example only, configuration-related metadata for device 222 may comprise one or more images (e.g., backup images) generated of one or more of data, software, and system files associated with device 222. It is to be understood that creating a virtualized replica of device 222 based on at least a portion of the configuration-related metadata may further comprise instantiating one or more virtual processing elements (e.g., VMs, containers, etc.) in which to execute the virtualized replica of the device 222 by mirroring, in the virtualized replica, at least a portion of the configuration-related metadata of device 222. Further, illustrative embodiments are configured to apply a change to device digital twin 232 to replicate application of the change to device 222. Applying a change to device digital twin 232 to replicate application of the change to device 222 may further comprise receiving the change to be applied to device digital twin 232 and then executing the change. In some embodiments, the change may be defined via a script or a command line issued by digital twin management engine 210.

It is further realized that when device 222 is an electronic device such as, by way of example, a storage array, such infrastructure degrades over time in much the same way as any complex machine which is dependent on software and hardware components. Software defects may only become apparent over time, e.g., memory leaks or unhandled exceptions to unpredictable events. Also, the hardware components can degrade over time, e.g., thermal paste compound can degrade with time. While some system health incidents can be pre-empted by replacing items in advance of failure or via regular software updates, not all system health related incidents can be resolved in advance of negative outcomes.

To address the above and other technical difficulties in infrastructure such as, but not limited to, storage arrays, illustrative embodiments are configured to obtain (periodically or otherwise) one or more measurement datasets from the infrastructure and/or from within the infrastructure environment (e.g., workloads, historical health data, vendor-provided health data, etc.), create a digital twin for each infrastructure, apply artificial aging techniques to the digital twin as described herein, monitor the digital twin behavior and output to detect anomalies, remediate the cause(s) of anomalous behavior (e.g., replace hardware, install firmware/software patch, etc.), and rerun digital twin aging to determine if the health issue(s) is resolved. FIG. 3B illustrates an exemplary process 310 of artificially aging a digital twin to predict and address one or more health conditions of an infrastructure according to an illustrative embodiment. By way of example, process 310 can be executed in accordance with computing environment 200 of FIG. 2. As shown, process 310 involves digital twin management engine 210 and device digital twin 232 at a first time T1 corresponding to a first state of one of devices 222-1, 222-2, and 222-3 (individually referred to in the context of FIG. 3B as device 222), at a second time T2 corresponding to a second state of device 222, and at a third time T3 corresponding to a third state of device 222. Note that a counter 302 in device digital twin 232 can be used to maintain the time instance associated with each state of device 222 that device digital twin 232 is virtually representing.

Thus, as shown, assume that digital twin management engine 210 receives one or more datasets from device 222, i.e., referred to as one or more measurement datasets comprising workloads, historical health data and vendor-provided health data (collectively referred to as health data) measured or otherwise collected for device 222. Note that, in this non-limiting example, workloads can be any IO operations performed in accordance with a storage array, while health data can be any attributes, parameters, values, and the like, associated with the storage array that are indicative of one or more health conditions or behaviors (e.g., age, active service duration, environmental operating conditions, reliability statistics, etc.). Note that one or more measurement datasets can alternatively or additionally be received from some other data source other than directly from device 222 and may include other types of data not expressly mentioned here as may be needed/desired.

Digital twin management engine 210 then applies all or a portion of the one or more measurement datasets associated with device 222 (e.g., workloads, health data, etc. referred to as device-related datasets) to device digital twin 232 to advance device digital twin 232 from the first time T1 corresponding to the first state of device 222 to the second time T2 corresponding to the second state of device 222. It is assumed that the goal is that device digital twin 232 represents the state (e.g., hardware, software, and/or data configurations) of device 222 at T2. More particularly, device digital twin 232 generates device-related results (e.g., results of execution of one or more physics-based models 110, the one or more AI-driven models 112, the one or more simulations 114, the one or more analytics 116, and/or the one or more predictions 118 that constitute device digital twin 232) based on the device-related dataset(s) provided by digital twin management engine 210.

For example, using at least a portion of the workloads and health data obtained for device 222, device digital twin 232 is configured to artificially age or advance device digital twin 232 from a current state (at T1) to a future state (at T2) utilizing, for example, the one or more prediction modules 118 (e.g., one or more machine learning algorithms or other available AI-based predictive methodologies) to predict a future health condition (e.g., anomalous behavior) that could occur or otherwise exist in device 222 given its current health condition. By way of example only, the predicted anomalous behavior can be that one or more of the storage disks that constitute the storage array of device 222 will likely degrade beyond acceptable operating conditions (e.g., violate one or more customer service level agreements) in three years. By way of another example, the predicted anomalous behavior can be that the current version of operational software running on the storage array will likely malfunction due to one or more latent software bugs within one year.

Digital twin management engine 210 is configured to receive the anomalous behavior prediction results (e.g., one or more predicted health conditions) from device digital twin 232 and apply one or more solution datasets to attempt to address the predicted health conditions (note that solution datasets can be obtained or otherwise derived, for example, by IT personnel, automated systems, and/or some other source). In so doing, device digital twin 232 is artificially aged or advanced to time T3 to represent device 222 at a third state. Again, the one or more prediction modules 118 of device digital twin 232 predict a future condition of device 222 given application of the one or more solution datasets. For example, in the latent software bug scenario mentioned above, a solution dataset can include a software patch that is executed by device digital twin 232 to simulate its effect on the one or more latent software bugs.

Digital twin management engine 210 is configured to then receive results of the solution dataset application. Assuming the solution successfully addresses (e.g., fixes or otherwise remediates) the predicted health condition, digital twin management engine 210 sends some or all of the solution results to IT personnel and/or an automated system 320 to initiate or otherwise take one or more actions in response to at least a portion of the received results, i.e., actually apply the solution to device 222 to proactively prevent the future health condition from occurring (e.g., apply the above-mentioned software patch to device 222). Additionally or alternatively, digital twin management engine 210 can initiate or otherwise take one or more actions in response to at least a portion of the received results.

It is to be further understood that if the solution is not successful, digital twin management engine 210 can provide another solution dataset to device digital twin 232 to simulate and predict results of the alternative solution. This iterative process can occur as many times as needed/desired to achieve an acceptable solution. Depending on the nature of the alternative solution, device digital twin 232 can be reversed to the second state at T2 before applying the alternative solution, or the alternative solution can be applied starting at the third state at T3. Following the application of the alternative solution, the device digital twin 232 would represent a fourth state at a time T4 (not expressly shown).

Figure 3B:
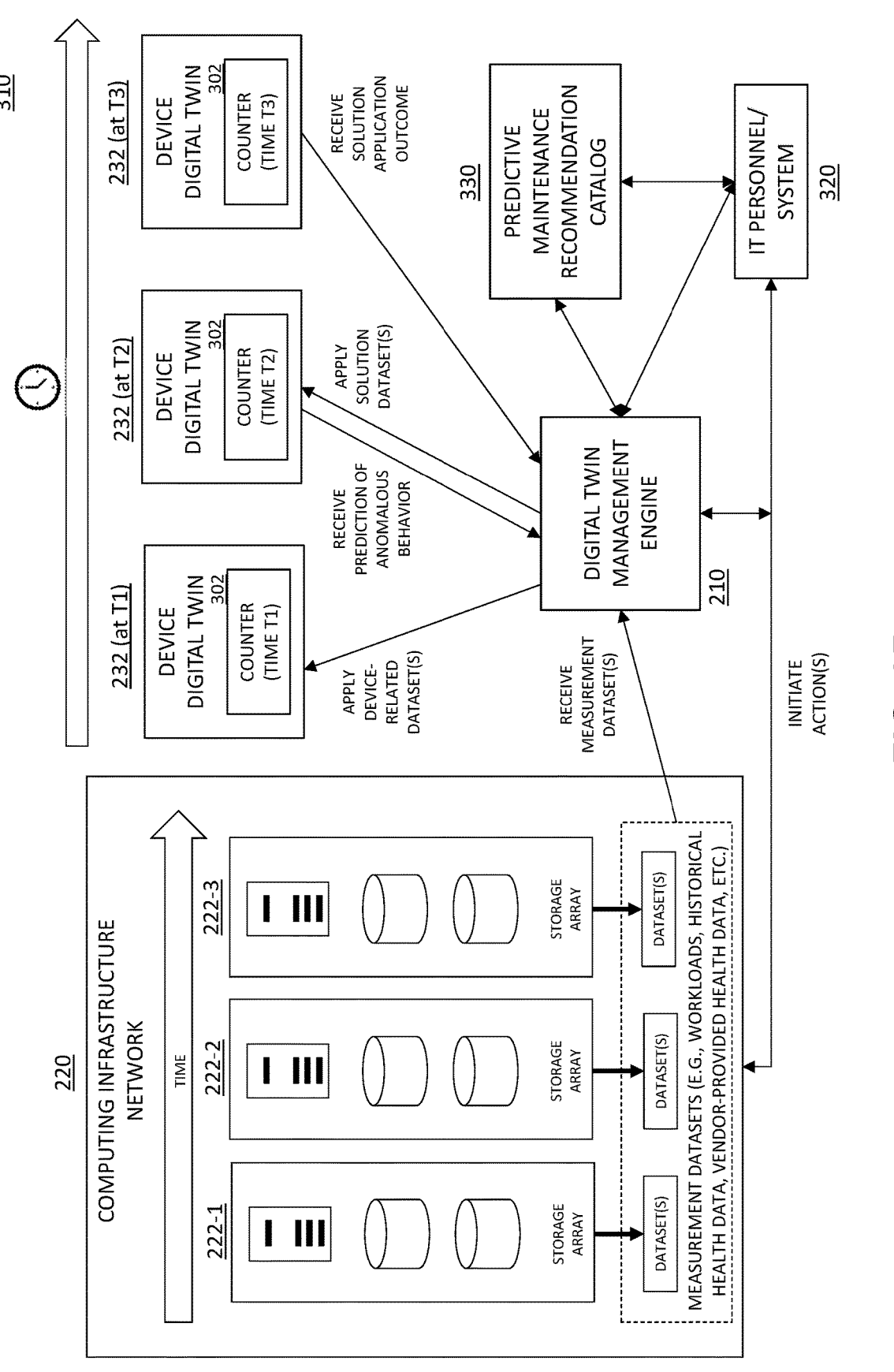
FIG. 3B illustrates an exemplary process of artificially aging a digital twin to predict one or more health conditions of an infrastructure according to an illustrative embodiment.

As further shown in process 310 of FIG. 3B, successful solutions (and, if informative, unsuccessful solutions) are compiled into a predictive maintenance recommendation catalog 330 operatively coupled to digital twin management engine 210. For example, in some embodiments, predictive maintenance recommendation catalog 330 comprises a semantic catalog of predictive maintenance recommendations with metadata allowing for explainable outcomes.

Turning now to FIG. 4, a methodology 400 is illustrated for artificially aging a digital twin to predicting one or more health conditions associated with an infrastructure according to an illustrative embodiment. It is to be understood that, in illustrative embodiments, methodology 400 is performed by computing environment 200 of FIG. 2. As shown, step 402 obtains at least one virtual representation of an infrastructure, wherein the virtual representation represents the infrastructure in a first state. Step 404 applies a first dataset to the virtual representation to artificially advance the virtual representation to represent the infrastructure in a second state. Step 406 obtains results representing the infrastructure in the second state, responsive to applying the first dataset to the virtual representation, wherein at least a portion of the results are indicative of a predicted health condition associated with the infrastructure. Step 408 applies a second dataset to the virtual representation to artificially advance the virtual representation to represent the infrastructure in a third state. Step 410 obtains results representing the infrastructure in the third state, responsive to applying the second dataset to the virtual representation, wherein at least a portion of the results are indicative of an outcome to a solution applied via the second dataset to the predicted health condition associated with the infrastructure. Step 412 initiates one or more actions with respect to the infrastructure to address the predicted health condition, when the solution applied via the second dataset to the predicted health condition is successful.

While the above-described steps of FIG. 4 and otherwise described herein can be performed by a controller such as digital twin management engine 210, in alternative embodiments, functionalities associated with digital twin management engine 210 can be implemented in one or more device digital twins 232 themselves such that each device digital twin 232 comprises a controller for performing the artificially aging and other operations and/or functions (e.g., health condition prediction and remediation) described herein.

The particular processing operations and other system functionality described in conjunction with the diagrams described herein are presented by way of illustrative example only and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for artificially aging a digital twin will now be described in greater detail with reference to FIGS. 5 and 6. Although described in the context of systems/module/processes of FIGS. 1-4, these platforms may also be used to implement at least portions of other information processing systems in other embodiments.

Figure 5:
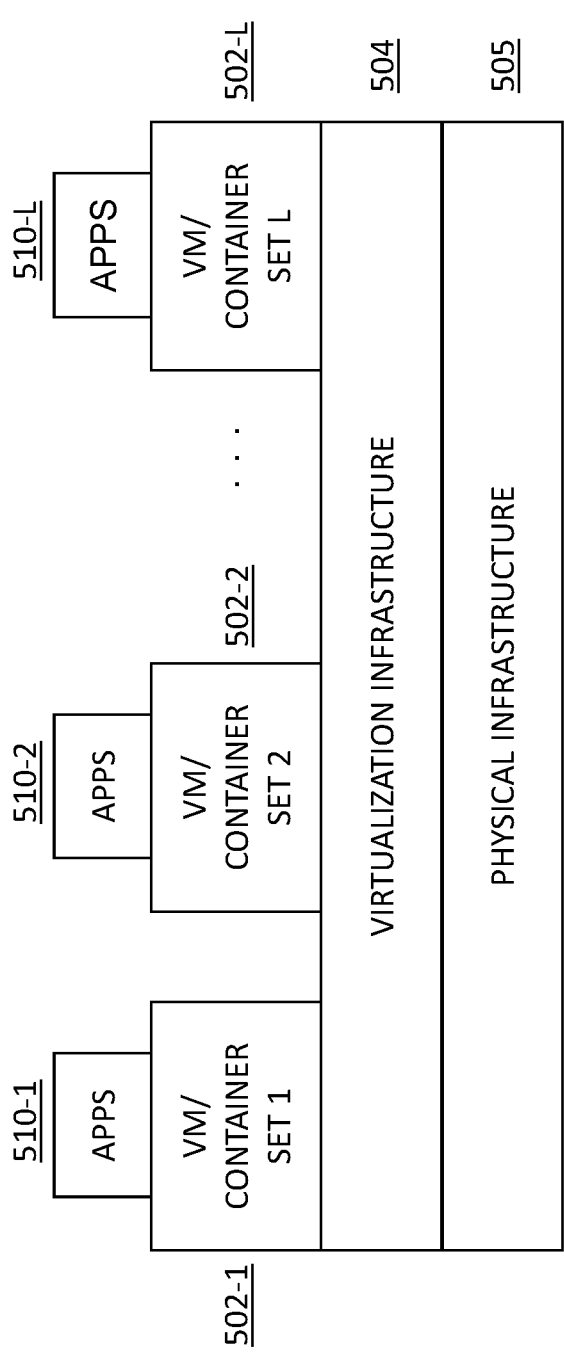
FIGS. 5 and 6 illustrate examples of processing platforms that may be utilized to implement at least a portion of an information processing system with digital twin management functionality according to one or more illustrative embodiments.
Figure 6:
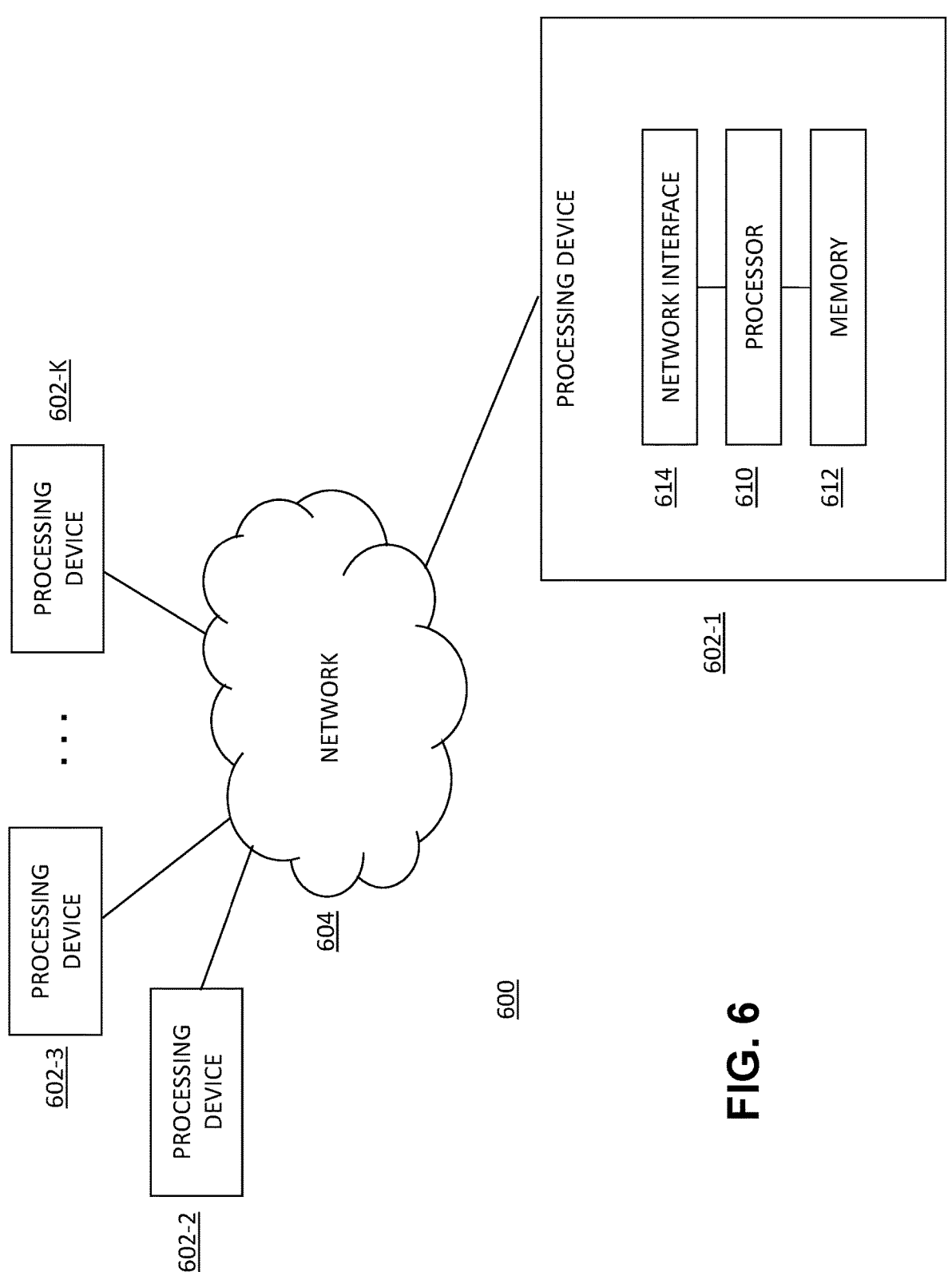

FIG. 5 shows an example processing platform comprising cloud infrastructure 500. The cloud infrastructure 500 comprises a combination of physical and virtual processing resources that may be utilized to implement at least a portion of computing environment 200. The cloud infrastructure 500 comprises multiple VM/container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure.

The cloud infrastructure 500 further comprises sets of applications 510-1, 510-2, . . . 510-L running on respective ones of the VM/container sets 502-1, 502-2, . . . 502-L under the control of the virtualization infrastructure 504. The VM/container sets 502 may comprise respective sets of one or more VMs and/or one or more containers.

In some implementations of the FIG. 5 embodiment, the VM/container sets 502 comprise respective containers implemented using virtualization infrastructure 504 that provides operating system level virtualization functionality, such as support for Kubernetes-managed containers.

As is apparent from the above, one or more of the processing modules or other components of computing environment 200 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of computing environment 200 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture or computer program products comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and systems/modules/processes of FIGS. 1-4 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity, PowerMax, PowerFlex (previously ScaleIO) or PowerStore storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining at least one virtual representation of an infrastructure which is physically deployed, wherein the virtual representation represents the infrastructure in a first state;

applying a first dataset to the virtual representation of the infrastructure in the first state to artificially advance the virtual representation to represent the infrastructure in a second state and to predict a health condition associated with the infrastructure as represented by the virtual representation of the infrastructure in the second state;

obtaining results representing the infrastructure in the second state, responsive to applying the first dataset to the virtual representation, wherein at least a portion of the results include a predicted health condition associated with the infrastructure as represented by the virtual representation of the infrastructure in the second state;

applying a second dataset to the virtual representation of the infrastructure in the second state to artificially advance the virtual representation to represent the infrastructure in a third state, the second dataset comprising a solution dataset which is applied to address the predicted health condition;

obtaining results representing the infrastructure in the third state, responsive to applying the second dataset to the virtual representation, wherein at least a portion of the results include an outcome to the solution dataset applied to address the predicted health condition; and initiating one or more actions with respect to the infrastructure to address the predicted health condition, when the outcome to the solution dataset applied to address the predicted health condition is deemed successful;

wherein the steps are performed by at least one processor and at least one memory storing executable computer program instructions.

2. The method of claim 1, wherein, when the infrastructure comprises a computing infrastructure, the first state, the second state, and the third state of the computing infrastructure, which the virtual representation represents, corresponds to at least one of a hardware configuration, a software configuration, and a data configuration of the computing infrastructure at a first time instance, a second time instance, and a third time instance, respectively.

3. The method of claim 2, wherein the first time instance comprises a time instance prior to an occurrence of the predicted health condition in the infrastructure, the second time instance comprises a time instance at or about the occurrence of the predicted health condition in the infrastructure, and the third time instance comprises a time instance at or about a resolution of the predicted health condition in the infrastructure.

4. The method of claim 1, wherein, when the outcome to the solution dataset applied to address the predicted health condition is deemed unsuccessful, further comprising:

applying a third dataset to the virtual representation of the infrastructure in the third state to artificially advance the virtual representation to represent the infrastructure in a fourth state, the third dataset comprising an alternative solution dataset which is applied to address the predicted health condition of the infrastructure; and obtaining results representing the infrastructure in the fourth state, responsive to applying the third dataset to the virtual representation, wherein at least a portion of the results include an outcome to the alternative solution dataset applied to address the predicted health condition associated with the infrastructure.

5. The method of claim 1, further comprising storing a description of the solution dataset applied to address the predicted health condition when the outcome to the solution dataset is deemed successful.

6. The method of claim 5, wherein the description of the solution dataset deemed to have a successful outcome is stored in a preventive maintenance recommendation catalog.

7. The method of claim 1, further comprising obtaining the first dataset from the infrastructure.

8. The method of claim 7, wherein the first dataset represents measurement data collected at the infrastructure.

9. The method of claim 8, wherein the measurement data comprises at least one of one or more workloads, historical health data, and vendor provided health data, associated with the infrastructure.

10. The method of claim 1, wherein the virtual representation comprises at least one digital twin.

11. An apparatus, comprising:

at least one processor and at least one memory storing computer program instructions wherein, when the at least one processor executes the computer program instructions, the apparatus is configured to:

obtain at least one virtual representation of an infrastructure which is physically deployed, wherein the virtual representation represents the infrastructure in a first state;

apply a first dataset to the virtual representation of the infrastructure in the first state to artificially advance the virtual representation to represent the infrastructure in a second state and to predict a health condition associated with the infrastructure as represented by the virtual representation of the infrastructure in the second state;

obtain results representing the infrastructure in the second state, responsive to applying the first dataset to the virtual representation, wherein at least a portion of the results include a predicted health condition associated with the infrastructure as represented by the virtual representation of the infrastructure in the second state;

apply a second dataset to the virtual representation of the infrastructure in the second state to artificially advance the virtual representation to represent the infrastructure in a third state, the second dataset comprising a solution dataset which is applied to address the predicted health condition;

obtain results representing the infrastructure in the third state, responsive to applying the second dataset to the virtual representation, wherein at least a portion of the results include an outcome to the solution dataset applied to address the predicted health condition; and initiate one or more actions with respect to the infrastructure to address the predicted health condition, when the outcome to the solution dataset applied to address the predicted health condition is deemed successful.

12. The apparatus of claim 11, wherein, when the infrastructure comprises a computing infrastructure, the first state, the second state, and the third state of the computing infrastructure, which the virtual representation represents, corresponds to at least one of a hardware configuration, a software configuration, and a data configuration of the computing infrastructure at a first time instance, a second time instance, and a third time instance, respectively.

13. The apparatus of claim 12, wherein the first time instance comprises a time instance prior to an occurrence of the predicted health condition in the infrastructure, the second time instance comprises a time instance at or about the occurrence of the predicted health condition in the infrastructure, and the third time instance comprises a time instance at or about a resolution of the predicted health condition in the infrastructure.

14. The apparatus of claim 11, wherein, when the outcome to the solution dataset applied to address the predicted health condition is deemed unsuccessful, the apparatus is further configured to:

apply a third dataset to the virtual representation of the infrastructure in the third state to artificially advance the virtual representation to represent the infrastructure in a fourth state, the third dataset comprising an alternative solution dataset which is applied to address the predicted health condition of the infrastructure; and obtain results representing the infrastructure in the fourth state, responsive to applying the third dataset to the virtual representation, wherein at least a portion of the results include an outcome to the alternative solution dataset applied to address the predicted health condition associated with the infrastructure.

15. The apparatus of claim 11, wherein the apparatus is further configured to store a description of the solution dataset applied to address the predicted health condition when the outcome to the solution dataset is deemed successful.

16. The apparatus of claim 15, wherein the description of the solution dataset deemed to have a successful outcome is stored in a preventive maintenance recommendation catalog.

17. A computer program product stored on a non-transitory computer-readable medium and comprising machine executable instructions, the machine executable instructions, when executed, causing a processing device to perform steps of:

obtaining at least one virtual representation of an infrastructure which is physically deployed, wherein the virtual representation represents the infrastructure in a first state;

applying a first dataset to the virtual representation of the infrastructure in the first state to artificially advance the virtual representation to represent the infrastructure in a second state and to predict a health condition associated with the infrastructure as represented by the virtual representation of the infrastructure in the second state;

obtaining results representing the infrastructure in the second state, responsive to applying the first dataset to the virtual representation, wherein at least a portion of the results include a predicted health condition associated with the infrastructure as represented by the virtual representation of the infrastructure in the second state;

applying a second dataset to the virtual representation of the infrastructure in the second state to artificially advance the virtual representation to represent the infrastructure in a third state, the second dataset comprising a solution dataset which is applied to address the predicted health condition;

obtaining results representing the infrastructure in the third state, responsive to applying the second dataset to the virtual representation, wherein at least a portion of the results include an outcome to the solution dataset applied to address the predicted health condition; and initiating one or more actions with respect to the infrastructure to address the predicted health condition, when the outcome to the solution dataset applied to address the predicted health condition is deemed successful.

18. The computer program product of claim 17, wherein, when the infrastructure comprises a computing infrastructure, the first state, the second state, and the third state of the computing infrastructure, which the virtual representation represents, corresponds to at least one of a hardware configuration, a software configuration, and a data configuration of the computing infrastructure at a first time instance, a second time instance, and a third time instance, respectively, and wherein the first time instance comprises a time instance prior to an occurrence of the predicted health condition in the infrastructure, the second time instance comprises a time instance at or about the occurrence of the predicted health condition in the infrastructure, and the third time instance comprises a time instance at or about a resolution of the predicted health condition in the infrastructure.

19. The computer program product of claim 17, wherein, when the outcome to the solution dataset applied to address the predicted health condition is deemed unsuccessful, further comprising:

applying a third dataset to the virtual representation of the infrastructure in the third state to artificially advance the virtual representation to represent the infrastructure in a fourth state, the third dataset comprising an alternative solution dataset which is applied to address the predicted health condition of the infrastructure; and obtaining results representing the infrastructure in the fourth state, responsive to applying the third dataset to the virtual representation, wherein at least a portion of the results include an outcome to the alternative solution dataset applied to address the predicted health condition associated with the infrastructure.

20. The computer program product of claim 17, further comprising storing a description of the solution dataset applied to address the predicted health condition when the outcome to the solution dataset is deemed successful.

* * * * *